United States Patent [19]
Himsl

[11] 3,917,204
[45] Nov. 4, 1975

[54] SUPPORT AND MOUNTING

[75] Inventor: Ernst G. Himsl, Kitchener, Canada

[73] Assignee: Massey-Ferguson Industries Limited, Toronto, Canada

[22] Filed: Aug. 28, 1972

[21] Appl. No.: 284,330

[52] U.S. Cl. .............. 248/188; 52/656; 52/758 H; 312/140; 403/231
[51] Int. Cl.² ........................................ F16M 11/16
[58] Field of Search ......... 248/188, 188.8; 211/182; 287/56, 189.36 H, 20.92 D; 312/257, 257 SK, 263, 140; 52/656; 403/231, 292

[56] References Cited
UNITED STATES PATENTS

| | | | |
|---|---|---|---|
| 319,903 | 6/1885 | Hall | 248/188 |
| 326,582 | 10/1885 | Osborn et al. | 248/188 |
| 1,408,553 | 3/1922 | Wedemann | 211/182 |
| 1,733,859 | 10/1929 | Brubaker | 248/188 |
| 2,868,602 | 1/1959 | Drezner | 248/188.8 |
| 3,053,558 | 9/1962 | Challas et al. | 248/188.8 |
| 3,642,310 | 2/1972 | Hudson | 312/257 R |
| 3,854,831 | 12/1974 | Gutner | 403/292 |

FOREIGN PATENTS OR APPLICATIONS

| | | | |
|---|---|---|---|
| 245,923 | 5/1963 | Australia | 248/188 |
| 1,006,307 | 9/1963 | United Kingdom | 248/188.8 |
| 1,329,026 | 4/1963 | France | 248/188 |

Primary Examiner—Marion Parsons, Jr.
Attorney, Agent, or Firm—Thomas P. Lewandowski

[57] ABSTRACT

In one form a support and its mounting are disclosed as a leg and a plug on which the leg is secured to attach the leg to a pedestal of a desk. Additional fasteners may be used to secure the leg to the plug as well as the pedestal, and the plug is capable of preventing rotation of the leg about its longitudinal axis relative to the pedestal.

7 Claims, 7 Drawing Figures

SUPPORT AND MOUNTING

Heretofore it has been known to support structures on supports, such as legs, by attaching the legs to the structure. For example, a desk may be supported by attaching legs to the pedestals thereon by passing a fastener such as a screw through the leg into the pedestal. Use of this method of attachment reveals the fastener when the assembly is completed. The fastener may be hidden by using hollow legs or legs with recesses therein for engaging a fastener on the pedestal which is hidden by the leg upon completion of assembly.

Particularly where the fastener is to be hidden, it often occurs that the leg is attached by only one of its sides. With only one side of the leg attached to the pedestal, the leg is very susceptible to twisting where a simple screw type fastener is used, for example, where the desk is picked up on one end only and pivoted about a leg supporting the opposite end of the desk. The tendency is for the leg to remain stationary and the pedestal to move, causing relative rotation between the pedestal and leg which can result in failure of the connection between them.

The tendency of the leg to rotate can be overcome by the addition of fasteners which again would be exposed or by the addition of a crossbar extending between opposing legs and affixed to each leg.

The present invention overcomes the above problem of rotation of a support relative to a structure with a mounting which is both hidden and capable of preventing the rotation.

The present invention relates to apparatus for supporting a structure such as a desk upon supports such as legs attached to a pedestal thereon, for example. The legs are attached to the pedestal by means of a mounting having plug, neck and arm portions providing engaging, attaching and securing means, respectively. A receptacle on the legs has a polygonal cross section corresponding to the polygonal cross section of the plug to provide receiving means for the plug.

The plug includes camming surfaces for frictionally engaging the receptacle to maintain the leg on the mounting and prevent the leg from rotating on the mounting relative to the structure.

The neck includes a chamfer on one corner to allow the mounting to be snapped into place within a slot in the pedestal.

The arm provides securing means for fastening the mounting to the pedestal in a cantilever fashion to permit the plug to overhang the pedestal.

The plug is particularly suited to prevent rotation of the legs about their longitudinal axes having leading, inclined and securing surfaces incorporated in the camming surfaces on the plug which are located on at least two opposing points of intersection of the sides of the plug cross section. The above surfaces are sequentially arranged to initially contact and align the plug within the receptacle, guide and direct the plug and finally engage it in a frictionally securing manner at points of tangency between the receptacle and camming surfaces.

Figure 1:
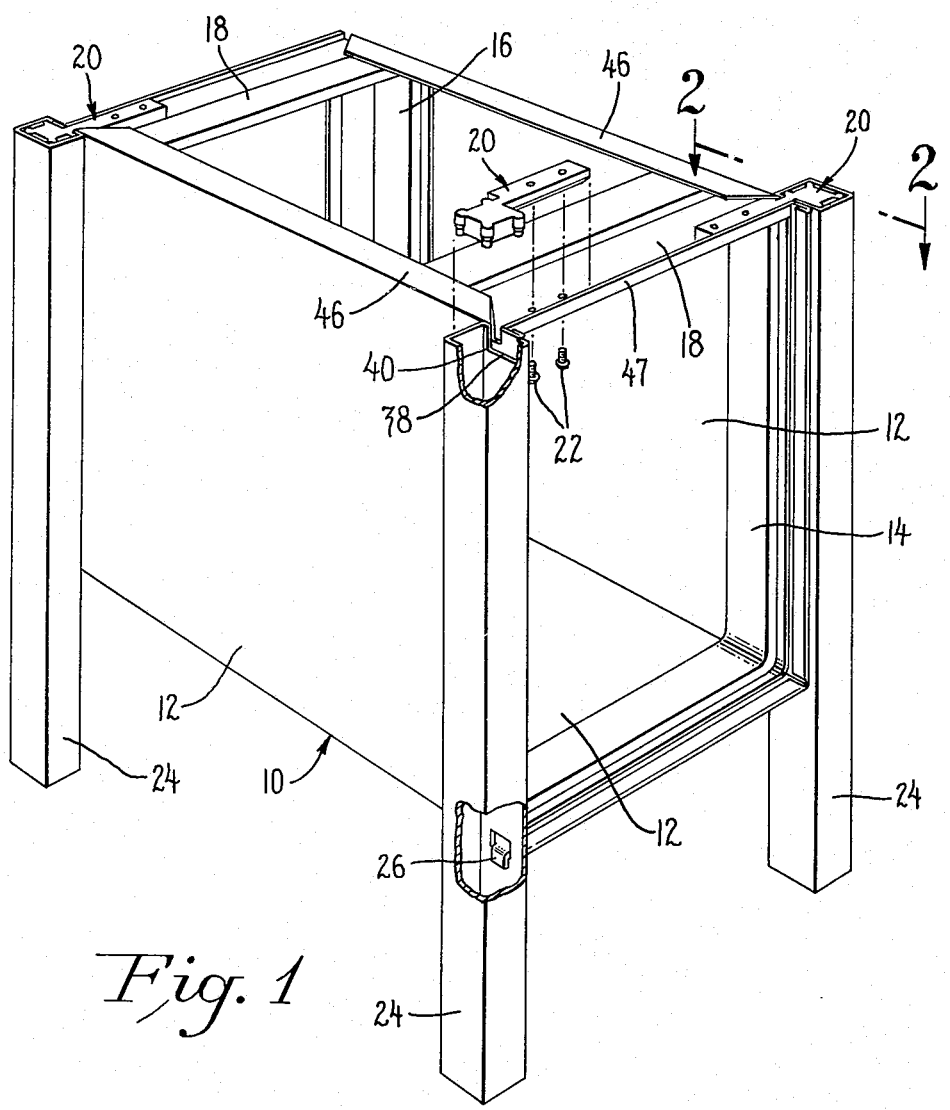
FIG. 1 is a perspective of a portion of a desk incorporating apparatus of the present invention with parts broken away, and partly exploded, to reveal further detail.

FIG. 1 illustrates a structure in the form of a pedestal 10 which is incorporated into a desk with the addition of a top, back and corresponding pedestal for the right hand side of the desk. The pedestal 10 is formed by a single piece of sheeting forming a wrapper 12 covering the sides and bottom. The desk top covers the top of the pedestal 10, the back of the desk covers the back of the pedestal 10 and the front is generally left open to receive drawers or the like.

A reinforcement member 14 frames the front opening providing structural rigidity for the wrapper 12. In the back of the pedestal 10, stiffeners 16 are incorporated into the side walls to maintain the surface of the walls flat. Interconnecting the top of the pedestal 10 and extending over the top of the reinforcement member 14 and stiffeners 16 are front and back cross members 18 used to attach the pedestal 10 to the desk top with suitable fasteners passing through the cross members 18 and into the top.

The cross members 18 also support the mountings 20 which are affixed thereto by suitable fasteners such as the screws 22. Other means of attaching the mountings could be used, for example, welding, as well as other fasteners such as rivets.

The mountings are located at the corners of the pedestal 10 and engage supports in the form of legs 24 which in turn support the pedestal 10 and desk. Locations of the legs 24 other than in corners is possible, but the corner position has the advantage of giving greater stability by increasing the distance between the legs 24.

A fastener in the form of a hook 26 is inserted into an opening in the legs 24 and secured to the pedestal 10 to prevent the bottom portion of the legs 24 from pulling away from the pedestal and to aid in maintaining the legs on the mountings 20.

Figure 2:
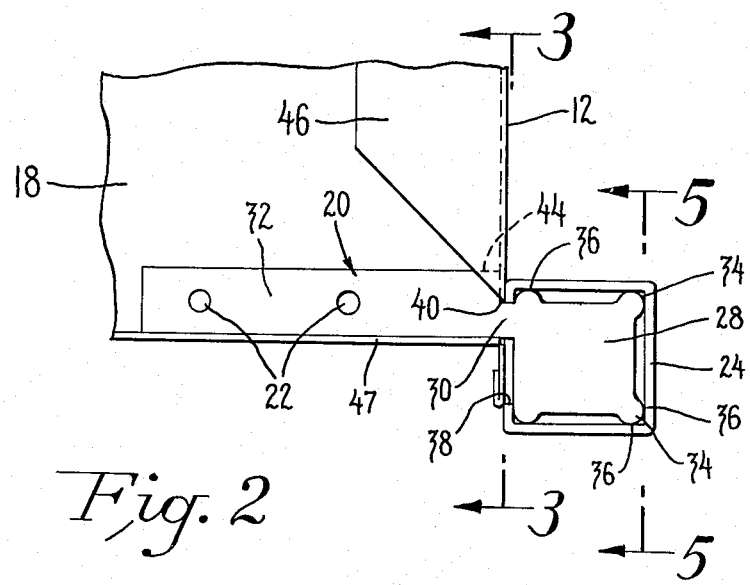
FIG. 2 is an enlarged fragmentary top view of a portion of the apparatus illustrated in FIG. 1 taken along line 2—2 thereof.

FIG. 2 illustrates the mounting 20 in greater detail as having three basic parts, a plug 28, neck 30 and arm 32. The plug 28 has a plurality of camming surfaces 34 at the intersection of its sides which would otherwise form a square cross section corresponding to the square cross section of the leg 24. It is to be understood that any polygonal cross sections could be used so long as both the plug 28 and leg 24 cross sections corresponded. The camming surfaces 34 which engage the inner periphery of the leg 24 are preferably circular providing contact at points of tangency with the sides of the periphery of the leg 24 as at 36. Other shapes could be used such as an oval. In all cases the tangential contact permits the adaption of the cross sections between the plug 28 on leg 24 and reduces the required dimensional tolerance to obtain a snug fit, particularly in the corners of a cross section as, for example, in the square cross section of the leg illustrated.

It will be noted that the side of the leg 24 adjacent the pedestal 10 is notched with a slot 38 to accommodate the neck 30 of the mounting 20. The slot 38 also allows a degree of flexure of the periphery of the leg 24 in the immediate vicinity of the plug 28 upon engagement with the leg 24 to enhance the frictional bond therebetween.

To accommodate the neck 30, the pedestal 10 must also have its wrapper 12 notched with a slot 40 (see FIG. 1). The neck 30 interconnects the plug 28 with the arm 32 which arm 32 provides a means for securing the mounting 20 to the pedestal 10. Thus, the neck 30 is a load bearing member capable of transfering torsional loads from the pedestal 10 to each of the legs 24, and enables the arm 32 to support the plug in a cantilever manner whereby it overhangs the pedestal. The slot 38 in the leg 24 is under cut to prevent the mounting 20 from receiving loading from the desk which is transmitted directly from the desk top to the leg 24 (see FIG. 1).

Figure 3:
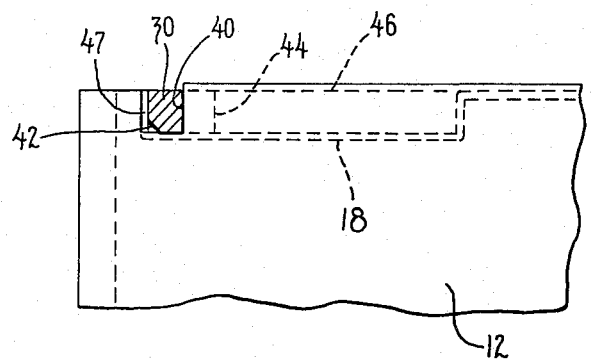
FIG. 3 is a cross-sectional view of the apparatus illustrated in FIG. 2 taken along line 3—3 thereof.
Figure 4:
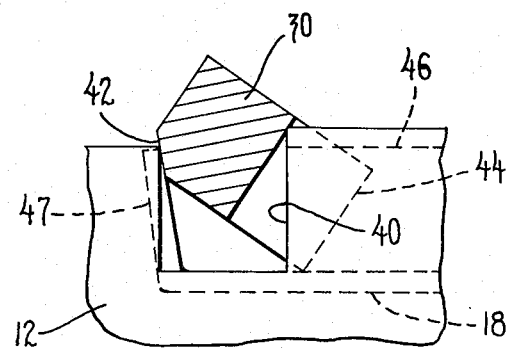
FIG. 4 is an enlarged fragmentary view of the apparatus illustrated in FIG. 3 in which the apparatus is illustrated in a position prior to final assembly.

FIG. 3 illustrates the cross section of the neck 30 which is rectangular with a chamfer 42 on one corner. In FIG. 2, the cutaway portion 44 of the arm 32 is illustrated and lies beneath the top flange 46 of the wrapper 12. By springing back a flange 47 on cross member 18, as illustrated in FIG. 4, the chamfer permits the cutaway portion 44 to be inserted beneath the flange 46, and the mounting 20 to be snapped snugly into place within the slot 40. Thus the boundary surrounding the neck 30 includes a biasing portion such as the flange 47. The ability to snap the mounting 20 in place facilitates assembly by allowing the mountings to be placed on and moved with the pedestal 10 prior to securing it with fasteners and by maintaining its position to aid in rapid insertion of the fasteners.

Figure 5:
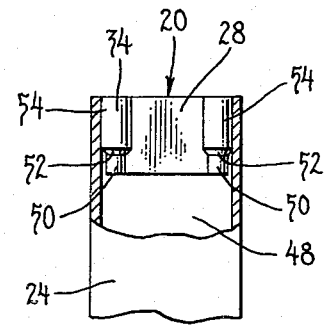
FIG. 5 is an elevational view of a portion of the apparatus illustrated in FIG. 2 with parts broken away and taken along line 5—5 thereof.

In FIG. 5, the leg 24 is illustrated as a receptacle 48 for the plug 28, the end of the leg 24 being hollow as where the leg 24 is a tubular member. One skilled in the art would be aware of modifications to solid legs to adapt them to receptacles such as by using recesses or sleeves. FIG. 5 also illustrates greater detail of the camming surfaces 34 including leading and inclined surfaces 50 and 52 in addition to the circular securing surfaces 54. The leading surfaces 50 are indented with the outer most points on their peripheries being intermediate those on the peripheries of the plug 28 and the securing surfaces 54 to permit easy insertion of the leading edges into the receptacle 48 and thereby guide the plug 28.

The inclined surfaces 52 are a transition between the securing surfaces 54 and leading surfaces 50 being conical where the latter are circular in cross section. The inclined surfaces 52 are capable of engaging the inner periphery of the the receptacle 48 and due to their convergence outwardly, in the direction counter to that of engagement between the plug 28 and receptacle 48, direct the receptacle 48 onto the plug 28. Where there is any misalignment or distortion between the mating pieces it can be appreciated that engagement of the inclined surface 52 within a corner of the receptable will prevent the plug 28 from binding in the corner upon insertion.

It would be possible to have camming surfaces at only two opposing corners of a given cross section, or intersection of the sides thereof, as well as a triangular cross section with cams in all three corners.

The snug fit between the plug 28 and the receptacle 48 together with the polygonal cross sections militate against rotation of the leg 24 relative to the plug 28 and, therefore, to the pedestal 10 along the longitudinal axis of the leg.

Figure 6:
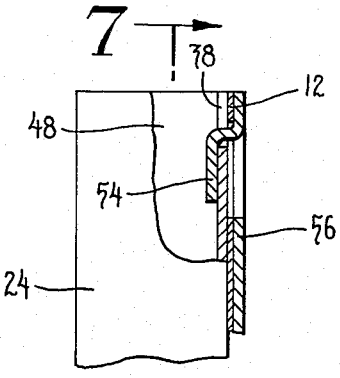
FIG. 6 is an elevational view of another embodiment of the present invention.
Figure 7:
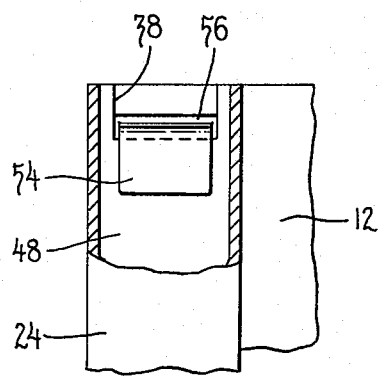
FIG. 7 is a cross-sectional view of the apparatus illustrated in FIG. 6 taken along line 7—7 thereof.

FIGS. 6 and 7 illustrate another embodiment for mounting a leg 24 having a receptacle 48 and slot 38 therein. A tongue 54 is formed by slotting a reinforcing plate 56 located behind the pedestal wrapper 12 and forming the projecting material with suitable bends to adapt it for engaging the receptacle within the slot 38.

The above embodiment also prevents rotation of the leg 24 and can be used where a reinforcing plate of sufficient strength to transmit torsional loads from the pedestal 10 to the leg 24 is present.

In accordance with the provisions of the patent statutes, the principal and mode of operation of the apparatus have been explained and what is considered to represent its best embodiment has been illustrated and described. It should, however, be understood that the invention may be practiced otherwise than as specifically illustrated and described without departing from its spirit or scope.

I claim:

1. Apparatus for supporting a structure comprising, a support alongside the structure and a mounting, means for receiving said mounting, said means for receiving being on said support, an arm attached to said mounting for attachment of said mounting in a cantilever manner with respect to said structure, and caming surfaces on said mounting for frictionally engaging said receiving means to maintain said support on said mounting by said camming surfaces applying outward force on said receiving means and prevent said support from rotating on said mounting relative to the structure, a neck portion, said neck portion connecting said mounting with said arm, a slot in said structure, said neck portion having a cross section of a size to snugly engage said slot.

2. The apparatus defined in claim 1 wherein said neck portion interconnecting said mounting and said arm has a cross section less than the cross section of said arm.

3. The apparatus defined in claim 2 wherein the structure includes a biased portion as a part of the boundary of said slot for receiving said neck portion.

4. The apparatus defined in claim 2 wherein said support includes a slot for receiving said neck portion.

5. The apparatus defined in claim 3 wherein said neck portion includes a chamfer to allow said mounting to be snapped into place in the slot in the structure.

6. The apparatus defined in claim 1 wherein said camming surfaces are imposed on the periphery of said mounting adjacent said receiving means on at least two opposing points of intersection of the sides of said polygonal cross section.

7. A mounting for attaching a support to a structure comprising, a plug having a polygonal cross section, camming surfaces on the periphery of said plug engaging the support on at least two opposing points of intersection of the sides of said polygonal cross section, said camming surfaces including inclined and securing surfaces aligned in sequence corresponding to the direction of engagement of said mounting with the support to guide and engage the support with said surfaces, respectively, and means for securing said plug to the structure to maintain said support on said plug and prevent said support from rotating on said plug relative to the structure.

* * * * *